United States Patent Office 2,970,450
Patented Feb. 7, 1961

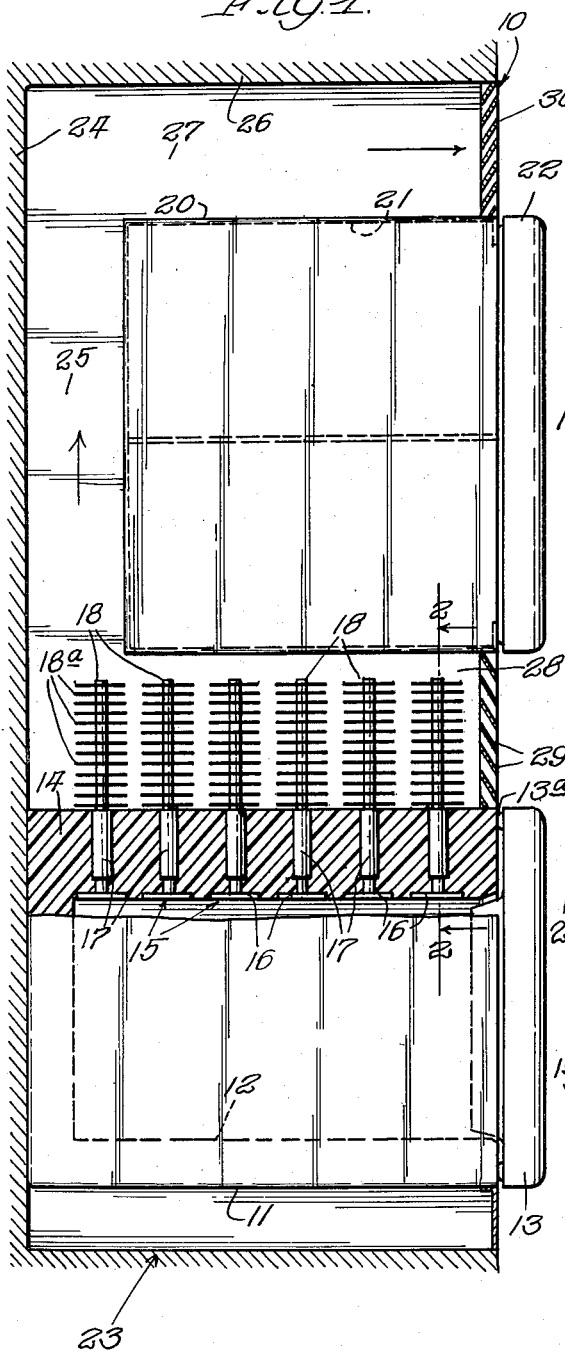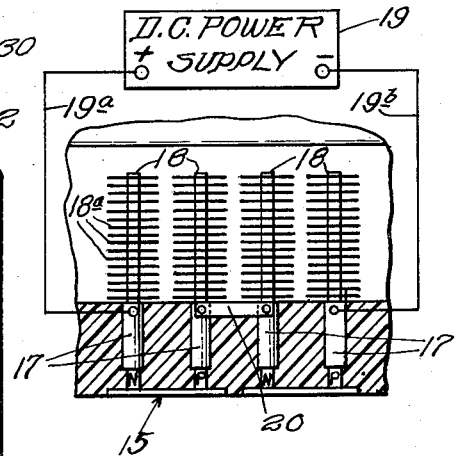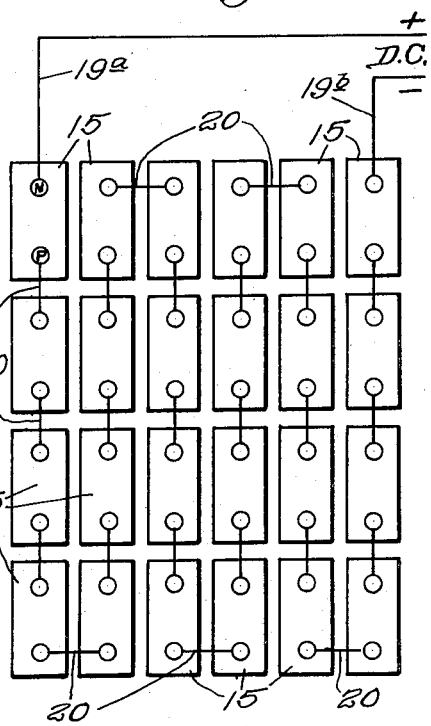

2,970,450

REFRIGERATING APPARATUS INCLUDING WARMING MEANS

John Roeder, Jr., Benton Harbor, and John G. Oakley, Coloma, Mich., assignors to Whirlpool Corporation, a corporation of Delaware Filed Apr. 28, 1958, Ser. No. 731,418

1 Claim. (Cl. 62—3)

This invention relates to refrigerating apparatus. In storing different foods, a number of different conditions are encountered. In the storage of certain foods, such as meats, a relatively low temperature is desirable. In the storage of other foods, such as cereals, a dry storage condition is desirable. In storing frozen foods, the foods are maintained at low freezing temperature and it is desirable to provide means for effecting a rapid defrosting thereof prior to their use.

The refrigerating apparatus of this invention includes a thermoelectric refrigerating means for effecting a low temperature storage. In adidtion, the apparatus provides means for utilizing the heat pumped from the low temperature storage. Thus the heat may be used for aiding a dry storage condition or for efficiently defrosting frozen foods.

The principal feature of the invention, therefore, is to provide a new and improved theremoelectric refrigerating apparatus.

Another feature is to provide such a refrigerating apparatus utilizing thermoelectric means for obtaining both lowered and elevated temperature conditions together with means for utilizing both said conditions.

Other features and advantages of the invention will be apparent from the following description taken in connection with the accompanying drawings wherein:

Fig. 1 is a vertical section of a refrigerating apparatus embodying the invention.

Fig. 2 is a transverse section taken approximately along the line 2—2 of Fig. 1 with the power supply shown diagrammatically.

Fig. 3 is a schematic wiring diagram of the thermoelectric refrigerating apparatus.

Figure 4:
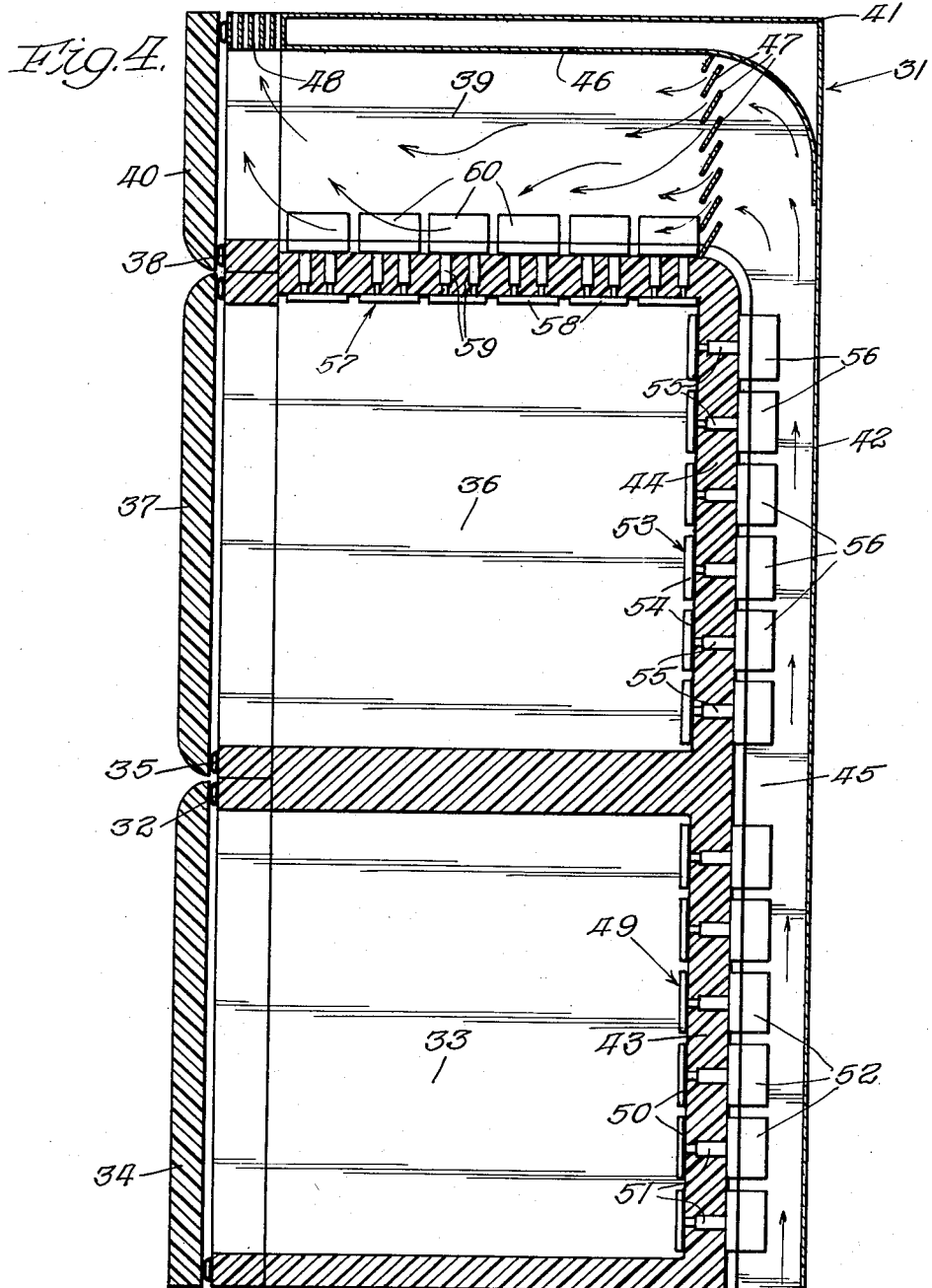
Fig. 4 is a fragmentary vertical section of a modified form of refrigerating apparatus with a portion thereof broken away.

In the embodiment of the invention disclosed in Figs. 1 through 3 of the drawings, a food storage means 10 includes a first cabinet 11 defining a first chamber 12 and having a door 13 sealed by a gasket 13a when closed providing access to chamber 12. Extending through the insulation wall 14 at the top of cabinet 11 is a refrigerating means comprising a plurality of thermoelectric Peltier type thermoelectric couples 15 having cold junctions 16 exposed to the interior chamber 12, hot junctions 17 extending through wall 14, and heat dissipating means 18 projecting upwardly from wall 14. An example of such thermoelectrtic couples is shown in the co-pending M. K. Baer, Jr. and C. R. Lopp application for a refrigerating apparatus, Serial No. 735,804, filed May 16, 1958, and assigned to the same assignee as this invention. For a proper understanding of the instant invention, however, it need only be understood that thermoelectric elements 15 function as a heat pump in accordance with the Peltier Effect principle to absorb heat energy at the cold junction and transfer it to the hot junction when a suitable electrical potential is applied thereto. As shown in Figs. 2 and 3, the operation of the thermoelectric elements 15 may be effected by a suitable direct current power supply 19, a plurality of thermoelectric elements 15 being connected by suitable connectors 20 in series between a positive lead 10a and a negative lead 19b connected to the power supply.

As indicated above, heat energy is transferred from cold junction 16 to hot junction 17 during operation of the thermoelectric elements 15. Heat dissipating means 18 including fins 18a removes this heat energy from the hot junctions 17 and dissipates it to the surrounding atmosphere by means of the fins 18a.

As best seen in Fig. 1, a second cabinet 20 is spaced above cabinet 11 to define a passage 28, and heat dissipating means 18 projects upwardly from cabinet 11 to extend across the passage. Cabinet 20 defines a storage chamber 21, access to which is provided by a door 22 on the front thereof. Cabinets 11 and 20 are received in an outer housing 23, cabinet 20 being spaced forwardly of a rear wall 24 of the housing to provide a vertical flow passage 25, and spaced below the upper wall 26 to provide a horizontal outlet passage 27. The passages 28, 25 and 27 are interconnected to define an air flow path around the bottom, rear and top of the cabinet 20.

A grill 29 extends across the inlet to passage 28 between cabinets 11 and 20, and a grill 30 extends across the outlet of passage 27 between cabinet 20 and upper wall 26 of the housing 24. Thus, room air may pass by convection through inlet grill 29, through passage 28 wherein it is heated by passing over heat dissipating means 18, around the rear and top of cabinet 20 through passages 25 and 27, and outwardly from housing 24 through grill 30. If desired, a fan (not shown) may be used to accelerate the air flow. This transit of the warmed air around cabinet 20 maintains chamber 21 heated and thus relatively dry, providing desirable storage means for foods requiring such dry storage conditions.

In Fig. 4 is shown a modified form of food storage means 31 including a first chamber 33, access to which is provided by a door 34 sealed by a gasket 32. A second chamber 36 is disposed above chamber 33, access to which is provided by a door 37 sealed by a gasket 35. A third chamber 39 is disposed above chamber 36, access to which is provided by a door 40 sealed by a gasket 38. A housing 41 is associated with the cabinet to provide a passage 45 at the rear of chambers 33 and 36 and into and through chamber 39. For this purpose, housing 41 includes a vertical wall portion 42 spaced rearwardly from a rear wall 43 of chamber 33 and a rear wall 44 of chamber 36 to define the vertical portion of passage 45. Housing 41 is further provided with an upper wall portion 46 extending horizontally from vertical wall portion 42 and defining the upper boundary of chamber 39. A grill 47 extends transversely across chamber 39 at the inlet thereto from the vertical portion of passage 45 and serves to direct air flow downwardly toward the bottom of chamber 39 as the air passes therethrough. The outlet from chamber 39 is defined by a grill 48 opening upwardly at the front end of wall portion 46.

Chamber 33 is refrigerated by a plurality of thermoelectric couples 49 similar to thermoelectric couples 15 and having cold junctions 50 arranged to receive heat energy from chamber 33, hot junctions 51 extending through rear wall 43, and heat dissipating means in the form of fins 52 extending into passage 45 to dissipate the heat energy from the hot junctions to the body of air moving by convection through the flow passage. Thermoelectric elements 49 are arranged to maintain the temperature within chamber 33 suitable for normal refrigeration of food. Chamber 36 is refrigerated by a plurality of thermoelectric couples 53, similar to thermoelectric couples 15, and having cold junctions 54 arranged to receive the heat eneregy from chamber 36, hot junctions 55 extending through rear wall 44, and heat dissipating means 56 extending into the flow passage 45 for transferring heat energy from the hot junctions to the body of air moving through the flow passage. Chamber 36 is further refrigerated by means of thermoelectric couples 57 having cold junctions 58 arranged to receive heat energy from chamber 36, hot junctions 59, and heat dissipating means 60 extending into chamber 39. Thermoelectric couples 53 and 57 are preferably arranged to maintain the temperature within chamber 36 at a substantially lower temperature than the temperature within chamber 33, such as is suitable for storing frozen foods.

To defrost rapidly food materials, such as are maintained in the frozen state within chamber 36, the frozen food materials need merely be placed within chamber 39. As discussed above, the air flowing from passage 45 through chamber 39 is warmed in passage 45 by its passage over the heat dissipating means 52 and 56 therein. Heat dissipating means 60 further elevate the temperature within chamber 39. Thus, frozen foods placed in chamber 39 are quickly defrosted, as desired. It will of course be understood that a rack or perforated shelving would normally be used in the chamber 39 so that the food to be defrosted would not come in direct contact with the heat dissipating means 60.

While we have shown and described certain embodiments of our invention, it is to be understood that it is capable of many modifications. Changes, therefore, in the construction and arrangement may be made without departing from the spirit and scope of the invention as defined in the appended claim.

We claim:

A food storage means, comprising: a first chamber; first thermoelectric means having a hot junction, and a cold junction associated with the first chamber to withdraw heat therefrom and cause the temperature therein to be suitable for refrigerating food therein; a second chamber; second thermoelectric means having a hot junction, and a cold junction associated with the second chamber to withdraw heat therefrom and cause the temperature therein to be suitable for storage of frozen food therein; a third chamber, the hot junction of at least one of said thermoelectric means being disposed in direct heat transfer association with said third chamber; and means for associating a body of air with said hot junctions of the first thermoelectric means and delivering the body of air to said third chamber.

References Cited in the file of this patent

UNITED STATES PATENTS

| | | |
|---|---|---|
| 1,818,437 | Stuart | Aug. 11, 1931 |
| 2,412,774 | Hoffman | Dec. 17, 1946 |
| 2,467,464 | Carriere | Apr. 19, 1949 |
| 2,837,899 | Lindenblad | June 10, 1958 |
| 2,872,788 | Lindenblad | Feb. 10, 1959 |

FOREIGN PATENTS

| | | |
|---|---|---|
| 507,135 | Germany | Sept. 12, 1930 |